United States Patent
Koreeda et al.

(10) Patent No.: US 7,778,139 B2
(45) Date of Patent: Aug. 17, 2010

(54) OPTICAL INFORMATION RECORDING/REPRODUCING DEVICE AND OBJECTIVE LENS FOR THE SAME

(75) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 528 days.

(21) Appl. No.: 11/873,105

(22) Filed: Oct. 16, 2007

(65) Prior Publication Data

US 2008/0089207 A1 Apr. 17, 2008

(30) Foreign Application Priority Data

Oct. 17, 2006 (JP) .............................. 2006-282104

(51) Int. Cl.
*G11B 7/135* (2006.01)
(52) U.S. Cl. ...................... 369/112.08; 369/112.07; 369/112.12; 369/112.13
(58) Field of Classification Search ............ 369/112.07, 369/112.08, 112.11, 112.12, 112.13, 112.23
See application file for complete search history.

(56) References Cited

U.S. PATENT DOCUMENTS

| | | | |
|---|---|---|---|
| 6,498,689 | B2 | 12/2002 | Katsuma |
| 6,646,817 | B2 | 11/2003 | Katsuma |
| 6,995,929 | B2 | 2/2006 | Hendriks |
| 7,333,416 | B2 * | 2/2008 | Saito et al. ............. 369/112.08 |
| 2003/0107824 | A1 | 6/2003 | Takeuchi |
| 2004/0156301 | A1 | 8/2004 | Ikenaka |

FOREIGN PATENT DOCUMENTS

| | | |
|---|---|---|
| JP | 2002 6210 | 1/2002 |
| JP | 2004 288346 | 10/2004 |
| JP | 2005 513701 | 5/2005 |

OTHER PUBLICATIONS

U.S. Appl. No. 11/762,096 to Koizumi et al., filed Jun. 13, 2007.
U.S. Appl. No. 11/752,386 to Tashiro et al., filed May 23, 2007.
U.S. Appl. No. 11/765,498 to Koreeda et al., filed Jun. 20, 2007.

\* cited by examiner

*Primary Examiner*—Wayne R Young
*Assistant Examiner*—Adam R Giesy
(74) *Attorney, Agent, or Firm*—Greenblum & Bernstein, P.L.C.

(57) ABSTRACT

There is provided an objective lens used for an optical information recording/reproducing device for recording information to and/or reproducing information from two types of optical discs, by selectively using one of two types of substantially collimated light beams including first and second light beams. When wavelengths of the first and second light beams are respectively represented by $\lambda_1$ (nm) and $\lambda_2$ (nm), $\lambda_1 < \lambda_2$ is satisfied. The objective lens includes a first optical element, and a second optical element made of material different from that of the first optical element. The first and second optical elements are cemented via a cementing surface. Further, the objective lens is configured to satisfy a condition:

$$0.006 < \{(nR2-nR1)-(nB2-nB1)\} \times \left[\left\{\left(\frac{k2}{r2^3}\right)+8\times A42\right\}\times f1^3+2.29\right] < 0.038. \quad (1)$$

14 Claims, 8 Drawing Sheets

OPTICAL INFORMATION RECORDING/REPRODUCING DEVICE AND OBJECTIVE LENS FOR THE SAME

BACKGROUND OF THE INVENTION

The present invention relates to an objective lens which is installed in a device employing multiple types of light beams having different wavelengths, such as an optical information recording/reproducing device for recording information to and/or reproducing information from multiple types of optical discs differing in recording density.

There exist various standards of optical discs (CD, DVD, etc.) differing in recording density, protective layer thickness, etc. Meanwhile, new-standard optical discs (HD DVD (High-Definition DVD), BD (Blu-ray Disc), etc.), having still higher recording density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective lenses installed in the devices) of recent years are required to have compatibility with the above three types of optical discs. Incidentally, in this specification, the "optical information recording/reproducing devices" include devices for both information reproducing and information recording, devices exclusively for information reproducing, and devices exclusively for information recording. The above "compatibility" means that the optical information recording/reproducing device ensures the information reproducing and/or information recording with no need of component replacement even when the optical disc being used is switched.

In order to provide an optical information recording/reproducing device with the compatibility with optical discs of multiple standards, the device has to be configured to be capable of forming a beam spot suitable for the particular recording density of the new disc (in the switching of the optical disc to the new disc of a different standard) by changing a NA (Numerical Aperture) of the light beam employed for the information reproducing/registering, while also correcting spherical aberration which varies depending on the protective layer thickness. Since the diameter of the beam spot can generally be made smaller as the wavelength of the beam gets shorter, multiple laser beams having different wavelengths are selectively used by the optical information recording/reproducing device depending on the recording density of the optical disc being used. For example, for DVDs, a laser beam with a wavelength of approximately 660 nm (shorter than approximately 790 nm for CDs) is used. For the aforementioned new-standard optical discs, a laser beam with a wavelength still shorter than that for DVDs (e.g. so-called "blue laser" around 408 nm) is used in order to deal with the extra-high recording density.

An objective lens having the compatibility with optical discs with multiple standards is disclosed, for example, in Japanese Patent Provisional Publications Nos. 2002-6210 (hereafter, referred to as JP 2002-6210A), 2004-288346 (hereafter, referred to as JP 2004-288346A), and 2005-513701 (hereafter, referred to as JP 2005-513701A). JP 2002-6210A discloses a cemented objective lens formed of two types of lenses which have optical characteristics different from each other and are cemented to each other. In an optical system disclosed in JP 2002-6210A, the compatibility with two-types of optical discs (i.e., CD and DVD) is achieved by selectively using a near-infrared laser beam and a red laser beam and by causing each of the laser beams to enter the objective lens as a collimated beam.

JP 2004-288346A discloses a single element objective lens having a diffracting structure on a surface thereof. More specifically, the diffracting structure of the objective lens is configured such that a ratio between diffraction orders at which the diffraction efficiencies of a blue laser beam, a red laser beam and a near-infrared laser beam take the respective maximum values is represented as "2:1:1". In an optical system of JP 2004-288346A, each of a blue laser beam and a red laser beam enters the objective lens as a collimated beam, while a near-infrared laser beam enters the objective lens as a diverging beam. As a result, the compatibility with three types of optical discs is achieved.

JP 2005-513701A discloses a cemented lens having compatibility with two types of optical discs (i.e., DVD and HD DVD).

However, the cemented objective lens disclosed in JP 2002-6210A has a drawback that the cemented objective lens is not able to support reading or reproducing operation for a new standard optical disc having higher recording density than those of the CD and DVD although the cemented objective lens can be used suitably for the CD and DVD.

The objective lens disclosed in 2004-288346A has a drawback that the diffracting structure is not able to suitably correct the spherical aberration for both of the blue laser beam and the near-infrared laser beam. Since in general the tolerance to aberration decreases in accordance with increase of the recording density, the diffracting structure is designed such that the spherical aberration caused when the blue laser beam is used is corrected more suitably relative to the spherical aberration caused when the near-infrared laser beam is used. In order to suitably correct the spherical aberration caused when the near-infrared laser beam is used, it becomes necessary to increase the degree of divergence of the near-infrared laser beam entering the objective lens to some extent. In this case, a relatively large amount of off-axis aberration, such as a comma, may be produced when the lens shifts for a tracking operation.

The cemented objective lens disclosed in JP 2005-513701A is configured to have a substantially spherical cementing surface. Therefore, the function of correcting the spherical aberration of the cemented objective lens is limited. More specifically, if the cemented objective lens is designed to suitably correct aberration caused when one of the DVD and HD DVD is used, aberration caused when the other of the DVD and HD DVD is used can not be corrected sufficiently.

SUMMARY OF THE INVENTION

The present invention is advantageous in that an objective lens for an optical information recording/reproducing device (which executes information recording or reproducing on at least two types of optical discs of different standards by selectively using multiple light beams having different wavelengths), capable of forming a desirable beam spot on a record surface of each optical disc while reducing various aberrations (e.g. spherical aberration) irrespective of which of the optical discs is used, realizing high-accuracy information reproduction/recordation while securing high diffraction efficiency irrespective of which of the optical discs is used, can be provided.

According to an aspect of the invention, there is provided an objective lens used for an optical information recording/reproducing device for recording information to and/or reproducing information from two types of optical discs including a first optical disc and a second optical disc having a recording density lower than that of the first optical disc, by selectively using one of two types of substantially collimated light beams including first and second light beams. When wavelengths of the first and second light beams are respectively represented by $\lambda_1$ (nm) and $\lambda_2$ (nm), $\lambda_1 < \lambda_2$ is satisfied. The objective lens includes a first optical element, and a second optical element made of material different from that of the first optical element. The first and second optical elements are cemented via a cementing surface.

Further, the objective lens is configured to satisfy a condition:

$$0.006 < \{(nR2 - nR1) - (nB2 - nB1)\} \times \qquad (1)$$

$$\left[\left\{\left(\frac{k2}{r2^3}\right) + 8 \times A42\right\} \times f1^3 + 2.29\right] < 0.038$$

where nB1 represents a refractive index of the first optical element with respect to the wavelength $\lambda_1$, nB2 represents a refractive index of the second optical element with respect to the wavelength $\lambda_1$, nR1 represents a refractive index of the first optical element with respect to the wavelength $\lambda_2$, nR2 represents a refractive index of the second optical element with respect to the wavelength $\lambda_2$, r2 represents a radius of curvature of the cementing surface, k2 represents a conical coefficient of the cementing surface, A42 represents a fourth order aspherical coefficient of the cementing surface, and f1 represents a focal length of the objective lens defined when the first laser beam is used.

According to the above mentioned configuration, even if the substantially collimated light beam is incident on the objective lens, the spherical aberration caused on a recording surface of each optical disc can be suitably suppressed by adopting an appropriate aspherical shape depending on materials.

According to another aspect of the invention, there is provided an optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams. When wavelengths of the first to third light beams are respectively represented by $\lambda_1$ (nm), $\lambda_2$ (nm) and $\lambda_3$ (nm), $\lambda_1 < \lambda_2 \lambda_3$ is satisfied. The optical information recording/reproducing device has an objective lens. The objective lens includes a first optical element, and a second optical element made of material different from that of the first optical element. The first and second optical elements are cemented via a cementing surface. The objective lens is configured to satisfy a condition:

$$0.006 < \{(nR2 - nR1) - (nB2 - nB1)\} \times \qquad (1)$$

$$\left[\left\{\left(\frac{k2}{r2^3}\right) + 8 \times A42\right\} \times f1^3 + 2.29\right] < 0.038$$

where nB1 represents a refractive index of the first optical element with respect to the wavelength $\lambda_1$, nB2 represents a refractive index of the second optical element with respect to the wavelength $\lambda_1$, nR1 represents a refractive index of the first optical element with respect to the wavelength $\lambda_2$, nR2 represents a refractive index of the second optical element with respect to the wavelength $\lambda_2$, r2 represents a radius of curvature of the cementing surface, k2 represents a conical coefficient of the cementing surface, A42 represents a fourth order aspherical coefficient of the cementing surface, and f1 represents a focal length of the objective lens defined when the first laser beam is used.

Further, when a thickness of a protective layer of the first optical disc requiring use of the first light beam is represented by t1 (mm), a thickness of a protective layer of the second optical disc requiring use of the second light beam is represented by t2 (mm), and a thickness of a protective layer of the third optical disc requiring use of the third light beam is represented by t3 (mm), t1≈0.6 (mm), t2≈0.6 (mm) and t3≈1.2 (mm) are satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. Each of the first and second light beams is incident on the objective lens as a substantially collimated beam, and the third light beam is incident on the objective lens as a diverging beam. The optical information recording/reproducing device is configured to satisfy conditions (7), (8) and (9):

$$-0.02 < f1 \times M1 < 0.02 \qquad (7)$$

$$-0.02 < f2 \times M2 < 0.02 \qquad (8)$$

$$-0.24 < f3 \times M3 < -0.14 \qquad (9)$$

where M1 represents a magnification of the objective lens defined when the first optical disc is used, f1 (mm) represents a focal length of the objective lens defined when the first optical disc is used, M2 represents a magnification of the objective lens defined when the second optical disc is used, and f2 represents a focal length of the objective lens defined when the second optical disc is used, M3 represents a magnification of the objective lens defined when the third optical disc is used, and f3 represents a focal length of the objective lens defined when the third optical disc is used.

Since the substantially collimated beam is used for each of the first and second optical discs having relatively high recording densities, it is possible to suppress off-axis aberration caused when the objective lens is shifted by a tracking operation as well as the spherical aberration. Consequently, the recording operation and reproducing operation can be performed with a high degree of accuracy. Since the optical information recording/reproducing device employs the objective lens having the cementing surface formed to be an aspherical surface, the degree of divergence of the third light beam used for the third optical disc having a relatively low recording density, such as a CD, is adjusted to be a low level. Such a configuration makes it possible to prevent a condition of aberration from deteriorating even when the third optical disc is used.

In at least one aspect, the objective lens may satisfy a condition:

$$0.014 < \{(nR2 - nR1) - (nB2 - nB1)\} \times \qquad (2)$$

$$\left[\left\{\left(\frac{k2}{r2^3}\right) + 8 \times A42\right\} \times f1^3 + 2.29\right] < 0.028$$

In at least one aspect, when Abbe number of the second optical element at a d-ray is represented by vd2, the second optical element may satisfy a condition:

$$40 \leq vd2 \leq 80 \quad (3)$$

In at least one aspect, when a radius of curvature, a conical coefficient and an effective radius of a first surface of the first optical element are respectively represented by r1, k1 and h1, and an effective radius of the cementing surface is represented by h2, the objective lens may satisfy one of following conditions (4) and (5):

$$|(nR2 - nR1) - (nB2 - nB1)| > 0.005 \quad (4)$$

$$0.50 < \frac{RK2}{RK1} < 1.30 \quad (5)$$

where $RK1 = \dfrac{(h1^2/r1)}{\left[1 + \sqrt{1 - (k1+1) \times (h1/r1)^2}\right]}$ $RK2 = \dfrac{(h2^2/r2)}{\left[1 + \sqrt{1 - 2(k1+1) \times (h2/r2)^2}\right]}$ In at least one aspect, at least one of two surfaces of the objective lens other than the cementing surface may include a phase shift structure having a plurality of refractive surface zones concentrically formed about an optical axis of the objective lens. In this case, the phase shift structure is configured to give an optical path length approximately equal to $2\lambda_1$ to the first light beam in adjacent ones of the plurality of refractive surface zones.

In at least one aspect, at least one of two surfaces of the objective lens other than the cementing surface includes a phase shift structure having a plurality of refractive surface zones concentrically formed about an optical axis of the objective lens. In this case, the phase shift structure is configured to give an optical path length approximately equal to $10\lambda_1$ to the first light beam in adjacent ones of the plurality of refractive surface zones.

In at least one aspect, the objective lens may be configured to satisfy a condition:

$$0.01 < d1/d2 < 0.20 \quad (6)$$

where d1 represents a center thickness of the first optical element, and d2 represents a center thickness of the second optical element.

BRIEF DESCRIPTION OF THE
ACCOMPANYING DRAWINGS

Figure 1:
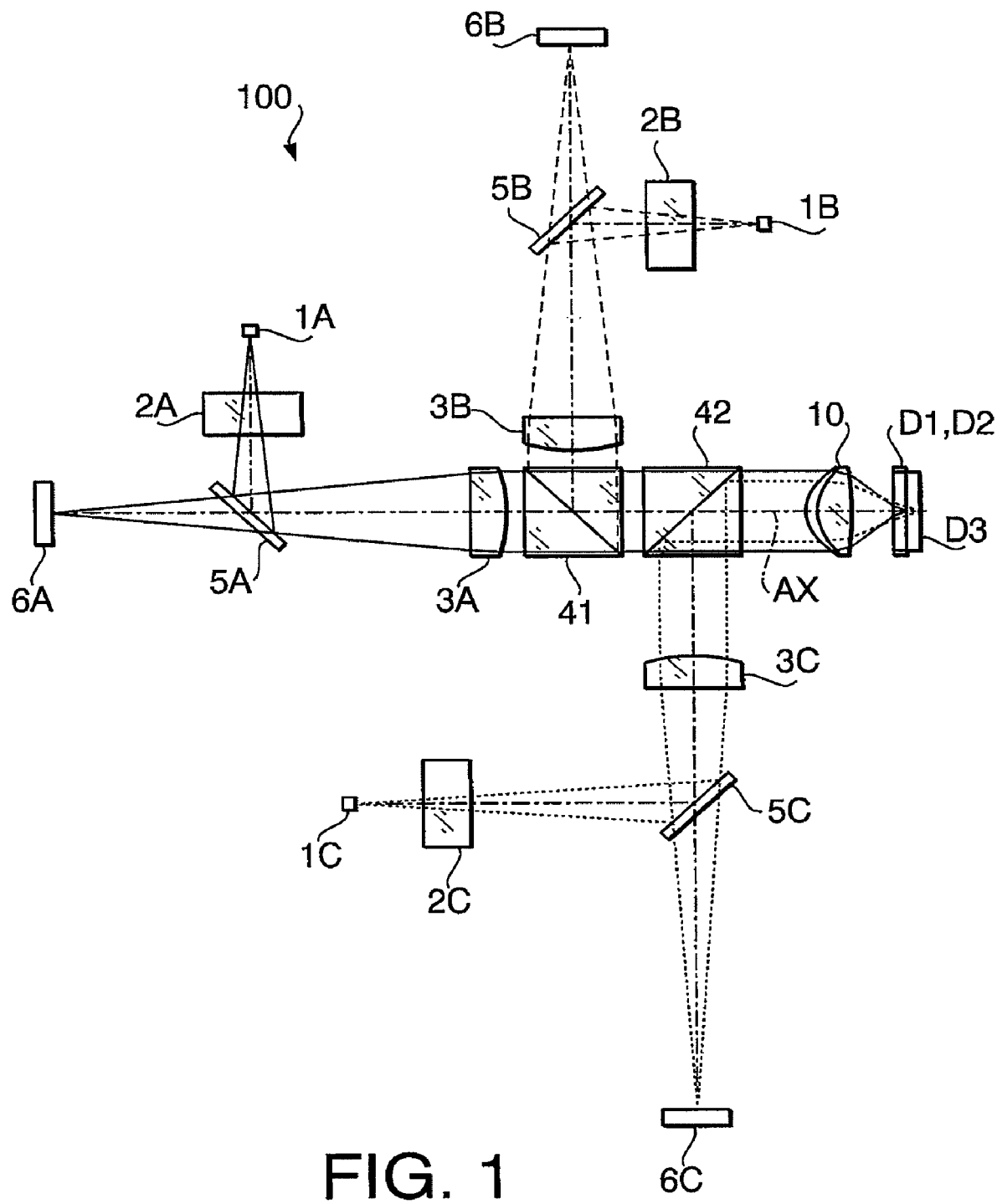
FIG. 1 is a schematic diagram showing an overall composition of an optical information recording/reproducing device according to an embodiment.

DETAILED DESCRIPTION OF THE
EMBODIMENTS

Hereinafter, an embodiment according to the invention is described with reference to the accompanying drawings.

In the following, an objective lens in accordance with an embodiment of the present invention will be described. The objective lens according to the embodiment, which is installed in an optical information recording/reproducing device, has the compatibility with three types of optical discs according to different standards (protective layer thickness, recording density, etc.).

In the following explanation, an optical disc of a type (one of the three types) having the highest recording density (e.g. a new-standard optical disc such as HD DVD or BD) will be referred to as a "optical disc D1", an optical disc of a type having a relatively low recording density compared to the first optical disc D1 (DVD, DVD-R, etc.) will be referred to as a "optical disc D2", and an optical disc of a type having the lowest recording density (CD, CD-R, etc.) will be referred to as a "optical disc D3" for convenience of explanation.

If the protective layer thicknesses of the optical discs D1-D3 are defined as t1, t2, t3, respectively, the protective layer thicknesses satisfy the following relationship:

$$t1 \leq t2 < t3$$

In order to carry out the information reproducing/recording on each of the optical discs D1-D3, the NA (Numerical Aperture) required for the information reproducing/recording has to be varied properly so that a beam spot suitable for the particular recording density of each disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationships:

$$(NA1 > NA3) \text{ and } (NA2 > NA3)$$

Specifically, for the information recording/reproducing on the optical disc D1, D2 (having high recording density), a relatively large NA is required since a relatively small spot has to be formed. On the other hand, for the information recording/reproducing on the optical disc D3 (having the lowest recording density), the required NA is relatively small. Incidentally, each optical disc is set on a turntable (not shown) and rotated at high speed when the information recording/reproducing is carried out.

In cases where three types of optical discs D1-D3 (having different recording densities) are used as above, multiple laser beams having different wavelengths are selectively used by the optical information recording/reproducing device so that a beam spot suitable for each recording density can be formed on the record surface of the optical disc being used. Specifically, for the information recording/reproducing on the optical disc D1, a "first laser beam" having the shortest wavelength (first wavelength) is emitted from a light source so as to form the smallest beam spot on the record surface of the optical disc D1. On the other hand, for the information recording/reproducing on the optical disc D3, a "third laser beam" having the longest wavelength (third wavelength) is emitted from a light source so as to form the largest beam spot on the record surface of the optical disc D3. For the information recording/reproducing on the optical disc D2, a "second laser beam" having a wavelength longer than that of the first laser beam and shorter than that of the third laser beam (second wavelength) is emitted from a light source so as to form a relatively small beam spot on the record surface of the optical disc D2.

Figure 2A:
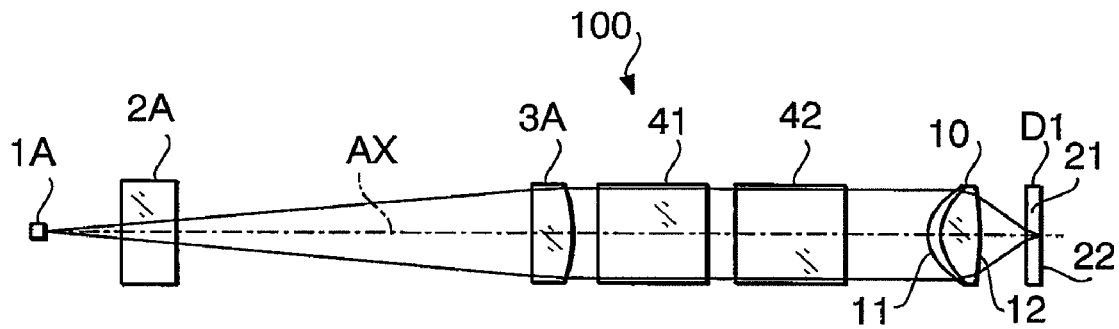
FIG. 2A is a block diagram of an optical system defined in the optical information recording/reproducing device when an optical disc D1 having the highest recording density is used.
Figure 2B:
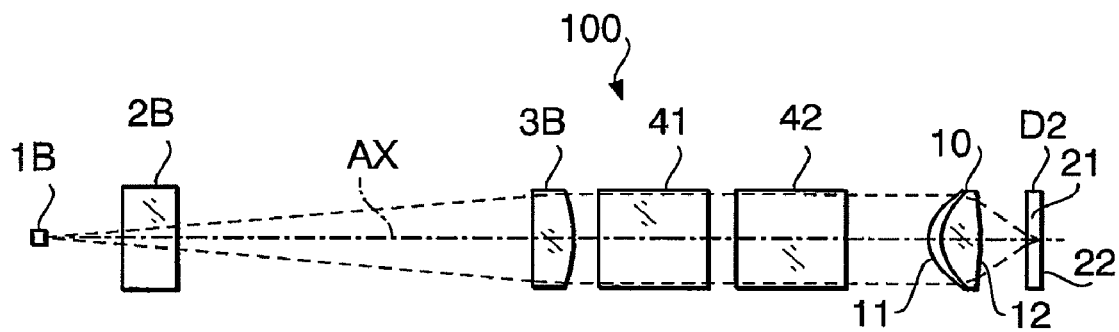
FIG. 2B is a block diagram of an optical system defined in the optical information recording/reproducing device when an optical disc D2 having the second highest recording density is used.
Figure 2C:
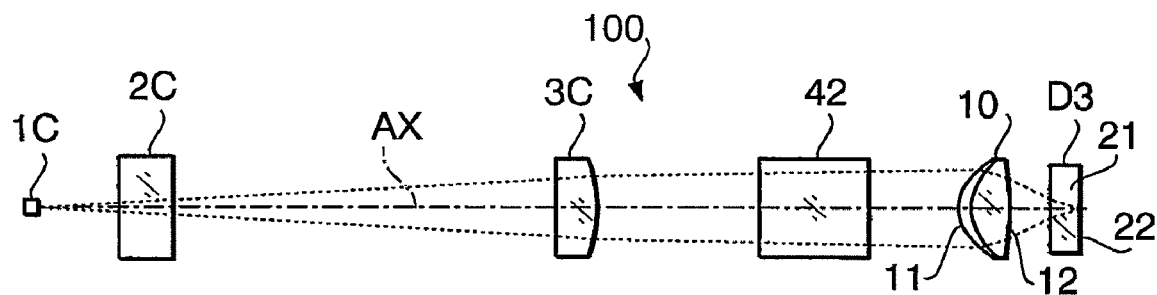
FIG. 2C is a block diagram of an optical system defined in the optical information recording/reproducing device when an optical disc D3 having the lowest recording density is used.

FIG. 1 is a schematic diagram showing the overall composition of an optical information recording/reproducing device 100 which is equipped with an objective lens 10 according to the embodiment. FIG. 2A is a block diagram of an optical system defined in the optical information recording/reproducing device 100 when the optical disc D1 is used. FIG. 2B is a block diagram of an optical system defined in the optical information recording/reproducing device 100 when the optical disc D2 is used. FIG. 2C is a block diagram of an optical system defined in the optical information recording/reproducing device 100 when the optical disc D3 is used. In each of FIGS. 1 and 2A-2C, a reference axis AX of the optical information recording/reproducing device 100 is represented by a chain line. In a state shown in each of FIGS. 2A-2C, an optical axis of the objective lens 10 coincides with the reference axis AX; however, there is a case where the optical axis of the objective lens 10 shifts from the reference axis, for example, for the tracking operation.

The optical information recording/reproducing device 100 includes a light source 1A which emits the first laser beam, a light source 1B which emits the second laser beam, a light source 1C which emits the third laser beam, coupling lenses 3A, 3B and 3C, diffraction gratings 2A, 2B and 2C, beam splitters 41 and 42, half mirrors 5A, 5B and 5C, and photoreceptor units 6A, 6B and 6C. Incidentally, since the optical information recording/reproducing device 100 has to support various NAs required for the information recording/reproducing on various optical discs, an aperture restricting element for specifying the beam diameter of the third laser beam may also be placed on an optical path of the third laser beam between the light source 1C and the objective lens 10 (although not shown in FIG. 1).

As shown in FIG. 1, the first to third laser beams emitted by the light sources 1A to 1C are respectively directed to a common optical path through the diffraction gratings 2A, 2B and 2C, the coupling lenses 3A, 3B and 3C and the beam splitters 41 and 42, and then enter the objective lens 10. After passing through the objective lens 10, each of the first to third laser beams respectively converges to the position close to the record surface of each of the optical discs D1-D3.

As shown in each of FIGS. 2A-2C, each optical disc has a protective layer 21 and a record surface 22. Specifically, the record surface 22 is sandwiched between a label layer (not shown) and the protective layer. The first to third laser beams reflected by the record surface 22 are detected by the photoreceptor units 6A, 6B and 6C, respectively, after passing through the half mirrors 5A to 5C.

Since the optical information recording/reproducing device 100 selectively uses the first to third laser beams for the optical discs D1-D3, the spherical aberration caused on the record surface of the optical disc being used changes depending on change of a refractive index or the difference in thickness of the protective layer between the optical discs D1-D3.

Considering such conditions, the objective lens 10 is formed by cementing optical elements 10A and 10B having different optical characteristics together. Optical surfaces defined in the objective lens 10 are designed to have appropriate shapes. In particular, a cementing surface on which the optical elements 10A and 10B are cemented together is designed to have a suitable optical characteristic. Aberration which the objective lens 10 is not able to correct sufficiently is corrected by changing the degree of divergence of a laser beam entering the objective lens 10. That is, the optical information recording/reproducing device 100 is able to suitably suppress the aberrations including the spherical aberration for all of the three types of optical discs D1-D3 thanks to the difference of the refractive index between the optical elements 10A and 10B, aspherical surface shapes of optical surfaces of the objective lens 10 (including the cementing surface), and the difference in magnification between the first to third laser beams.

The higher the recording density of an optical disc becomes, the lower the tolerance to aberration caused when recording or reproducing operation becomes. For this reason, the objective lens 10 is configured to suppress axial aberration including the spherical aberration caused when each of the optical discs D1 and D2 having the relatively high recoding densities is used, while suitably suppressing the off-axis aberration such as a comma and astigmatism through use of the substantially collimated beam. When the optical disc D3 having the relatively low recording density is used, the aberration components which can not be suitably suppressed by the optical property of the objective lens 10 are suitably suppressed through use of the diverging beam.

Figure 3A:
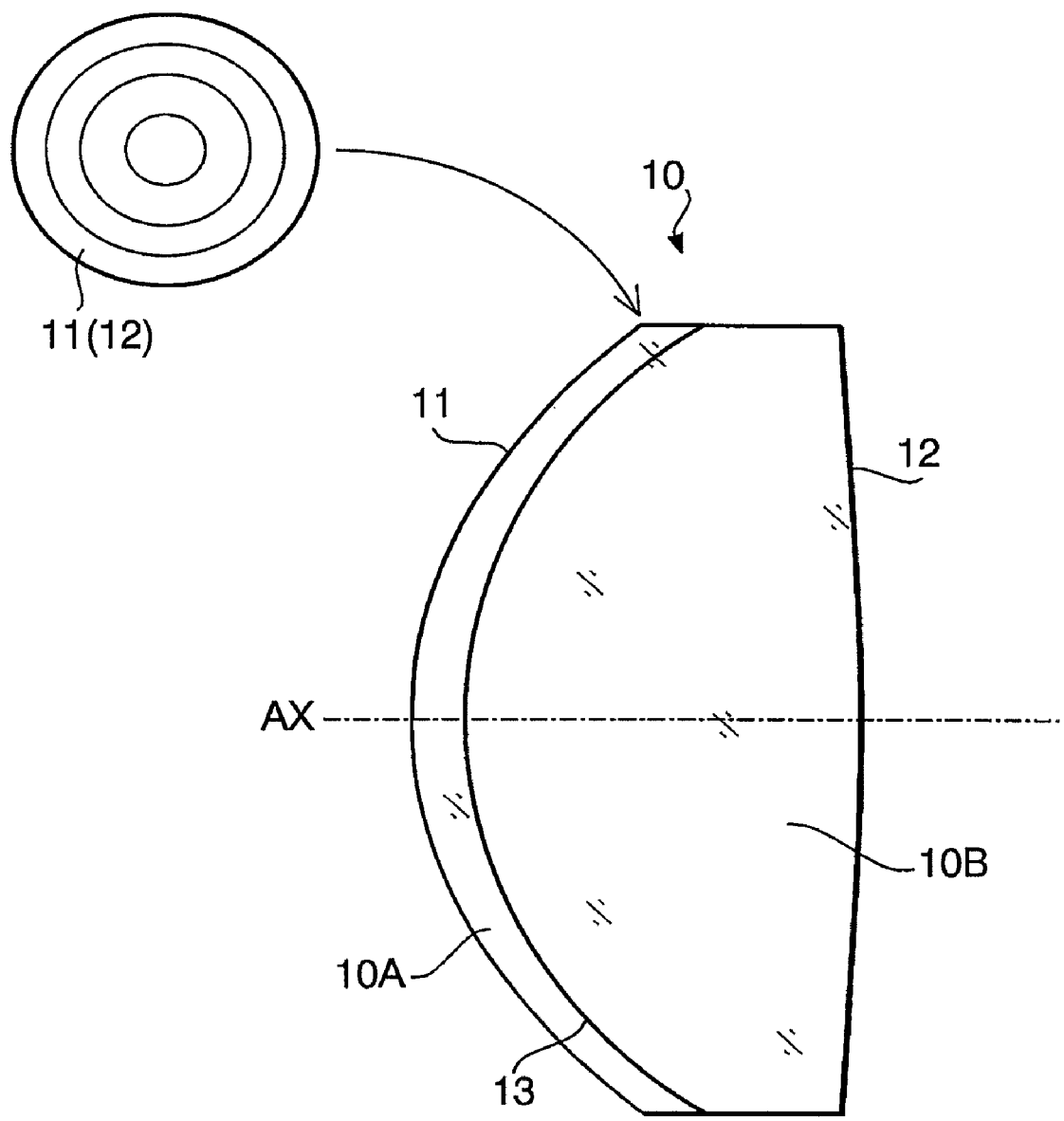
FIG. 3A is an enlarged cross section of an objective lens according to the embodiment.

FIG. 3A is an enlarged cross section of the objective lens 10. As shown in FIG. 3A, the objective lens 10 is a biconvex plastic lens formed by cementing the two different optical elements 10A and 10B together. The objective lens 10 has a first surface 11 on a light source side, second surface 12 nearest to the record surface, and a cementing surface 13. The cementing surface 13 is formed to be an aspherical surface. In addition, each of the first and second surfaces 11 and 12 is configured to be an aspherical surface so that a suitable beam spot can be formed on the record surface 22 of the optical disc being used while effectively suppressing aberrations.

The configuration of each aspherical surface can be expressed by the following expression:

$$X(h) = \frac{Ch^2}{1+\sqrt{1-(K+1)C^2h^2}} + \sum_{i=2} A_{2i}h^{2i}$$

where X(h) denotes a SAG amount of a coordinate point on the aspherical surface whose height (distance) from the optical axis is h (SAG amount: distance measured from a tangential plane contacting the aspherical surface on the optical axis), "C" denotes the curvature (1/r) of the aspherical surface on the optical axis, "K" denotes a cone constant, and each "$A_{2i}$" (i: integer larger than 1) denotes an aspherical coefficient of the 2i-th order (the summation in the expression includes aspherical coefficients $A_4, A_6, A_8, A_{10}, A_{12}, \ldots$ of the fourth order, sixth order, eighth order, tenth order, twelfth order, and so forth).

In order to suppress the spherical aberration when the collimated beam is incident on the objective lens 10 (i.e., when the optical disc D1 or D2 is used) and to form a suitable beam spot on the record surface 22, the objective lens 10 is configured to satisfy a condition:

$$0.006 < \{(nR2-nR1)-(nB2-nB1)\} \times \qquad (1)$$
$$\left[\left\{\left(\frac{k2}{r2^3}\right)+8\times A42\right\}\times f1^3+2.29\right] < 0.038$$

where nB1 represents a refractive index of the optical element 10A with respect to the first laser beam, nB2 represents a refractive index of the optical element 10B with respect to the first laser beam, nR1 represents a refractive index of the optical element 10A with respect to the second laser beam, nR2 represents a refractive index of the optical element 10B with respect to the second laser beam, r2 represents a radius of curvature of the cementing surface 13, k2 represents a conical coefficient of the cementing surface 13, A42 represents a fourth order aspherical coefficient of the cementing surface, and f1 represents a focal length of the objective lens 10 defined when the first laser beam is used.

The condition (1) relates to selection of suitable material for the optical elements 10A and 10B and a suitable aspherical surface shape of the cementing surface 13. If the value of the intermediate term of the condition (1) gets lower than or equal to the lower limit of the condition (1), correction of the spherical aberration caused when the optical disc D2 becomes excessive, and thereby the spherical aberration stays in an under state. If the value of the intermediate term of the condition (1) gets larger than or equal to the upper limit of the condition (1), correction of the spherical aberration caused when the optical disc D2 becomes insufficient, and thereby the spherical aberration remains in an over state.

In order to correct the spherical aberration more suitably, the objective lens 10 may be configured to satisfy a condition:

$$0.014 < \{(nR2-nR1)-(nB2-nB1)\} \times \qquad (2)$$
$$\left[\left\{\left(\frac{k2}{r2^3}\right)+8\times A42\right\}\times f1^3+2.29\right] < 0.028$$

In order to suitably suppress an longitudinal chromatic aberration caused when the optical disc D1 having lower tolerance to aberrations is used, the optical element 10B is configured to satisfy a condition:

$$40 \leq vd2 \leq 80 \qquad (3)$$

where vd2 represents an Abbe number at a d-ray.

The objective lens 10 may be configured to suitably suppress a coma even if the optical elements 10A and 10B are decentered with respect to each other when they are molded, by suppressing the aspherical amount of each of the optical surfaces 11 to 13 (in particular by suppressing the aspherical amount of the cementing surface 13). More specifically, the objective lens 10 is configured to satisfy at least one of conditions (4) and (5).

$$|(nR2-nR1)-(nB2-nB1)| > 0.005 \qquad (4)$$

$$0.50 < \frac{RK2}{RK1} < 1.30 \qquad (5)$$

where $RK1 = \dfrac{(h1^2/r1)}{\left[1+\sqrt{1-(k1+1)\times(h1/r1)^2}\right]}$ $RK2 = \dfrac{(h2^2/r2)}{\left[1+\sqrt{1-2(k1+1)\times(h2/r2)^2}\right]}$ In condition (5), r1 represents a radius of curvature of a first surface of the optical element 10A (i.e., the surface 11), k1 represents a conical coefficient of the surface 11, h1 represents an effective radius of the surface 11, and h2 represents an effective radius of the cementing surface 13.

If the left term of the condition (4) gets lower than or equal to the lower limit of the condition (4) (i.e., if the difference of a refractive index between the refractive index defined when the first laser beam is used and the refractive index defined when the second laser beam is used becomes small), the aspherical amount of the cementing surface 13 inevitably increases to suitably suppress the spherical aberration for both of the optical discs D1 and D2. In other words, when the optical elements 10A and 10B are decentered with respect to each other, a relatively large amount of comma is produced. If the value of the intermediate term of the condition (5) gets lower than or equal to the lower limit of the condition (5) or gets larger than or equal to the upper limit of the condition (5), the same problem as that regarding the condition (4) also occurs.

In order to secure the easiness for manufacturing, the objective lens 10 may be configured to satisfy a condition:

$$0.01 < d1/d2 < 0.20 \quad (6)$$

where d1 represents a center thickness (mm) of the optical element 10A, and d2 represents a center thickness (mm) of the optical element 10B.

In the optical information recording/reproducing device 100 having the objective lens 10 configured as above, the first and second laser beams emitted by the light sources 1A and 1B are respectively converted to the collimated beams by the coupling lenses 3A and 3B. That is, in this embodiment, each of the coupling lenses 3A and 3B serves as a collimator lens.

More specifically, the optical information recording/reproducing device 100 is configured to satisfy conditions (7) and (8):

$$-0.02 < f1 \times M1 < 0.02 \quad (7)$$

$$-0.02 < f2 \times M2 < 0.02 \quad (8)$$

where M1 represents the magnification of the objective lens 10 defined when the optical disc D1 is used, f1 represents a focal length of the objective lens 10 defined when the optical disc D1 is used, M2 represents the magnification of the objective lens 10 defined when the optical disc D2 is used, and f2 represents a focal length of the objective lens 10 defined when the optical disc D2 is used.

By using the collimated beam for each of the optical discs D1 and D2, it is possible to suppress the off-axis aberration such as a comma when the objective lens 10 shifts for the tracking operation. Consequently, it becomes possible to achieve the recording and reproducing operations with a high degree of accuracy without being affected by aberrations even when the optical disc (D1, D2) having a high recoding density and having the low tolerance to aberrations is used.

There may be a case when the first laser beam (second laser beam) is not precisely converted to a collimated beam by the coupling lens 3A (3B) depending on an individual difference between the light sources 1A and 1B, installation positions of the light sources 1A and 1B, and change of the environmental condition of the optical information recording/reproducing device 100. However, even if each of the first and second laser beams is not precisely equal to a collimated beam, a diverging angle of the beam is extremely small. Therefore, the aberration caused during the tracking operation is small. That is, from a practical standpoint, no problem occurs even if each of the first and second laser beams is not precisely equal to a collimated beam.

As described above, when the objective lens 10 is provided to suitably suppress aberrations caused when the optical disc D1 or D2 having the narrow tolerance to aberrations is used, the spherical aberration remains when the optical disc D3 is used. In this embodiment, the spherical aberration caused when the optical disc D3 is used is corrected by using a diverging beam as the third laser beam entering the objective lens 10. More specifically, the optical information recording/reproducing device 100 is configured to satisfy a condition:

$$-0.24 < f3 \times M3 < -0.14 \quad (9)$$

where M3 represents the magnification of the objective lens 10 defined when the optical disc D3 is used, and f3 represents a focal length of the objective lens 10 defined when the optical disc D3 is used. If the value of (f3×M3) gets larger than or equal to the upper limit of the condition (9), the spherical aberration in an over state remains. If the value of (f3×M3) gets lower than or equal to the lower limit of the condition (9), the spherical aberration in an under state is produced.

Figure 3B:
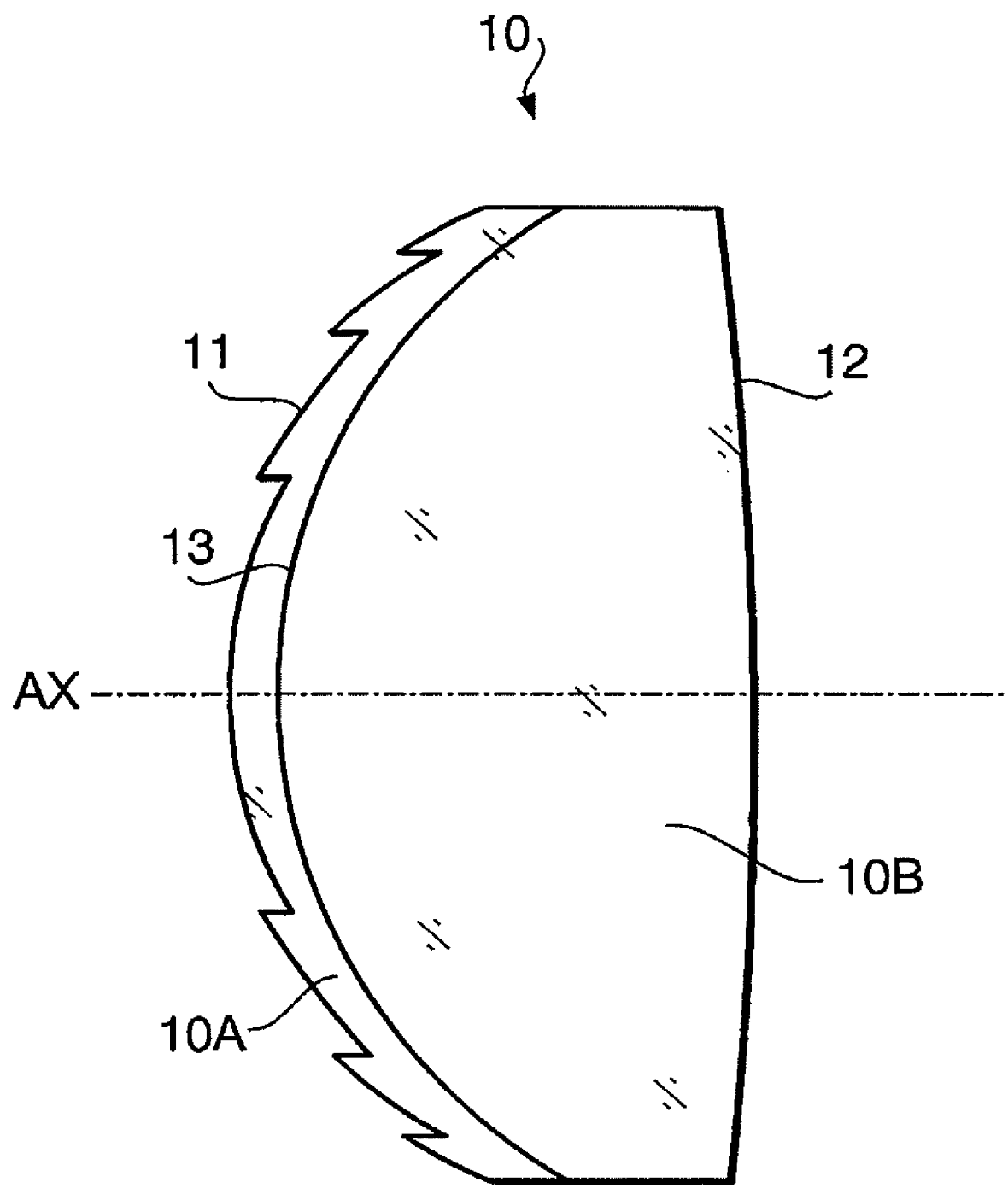
FIG. 3B is an enlarged cross section of the objective lens illustrating an example of a phase shift structure formed on a front side surface of the objective lens.

The objective lens 10 may be configured to have a phase shift structure on at least one of surfaces thereof (i.e., the surfaces 11 and 12) other than the cementing surface 13. The phase shift structure includes a plurality of refractive surface zones formed concentrically about the reference axis AX of an optical system in the optical information recording/reproducing device 100 (i.e., the optical axis of the objective lens 10), and minute steps each of which is formed between adjacent refractive surface zones. As an example, a conceptual diagram of the phase shift structure (a front or rear view) is also shown in FIG. 3A. FIG. 3B also shows an example of a phase shift structure formed on the surface 11 when viewed as a cross section of the objective lens 10.

When the phase shift structure is considered as a diffracting structure, the diffracting structure is represented by an optical path length difference function φ(h). The optical path length difference function φ(h) represents the function of the objective lens 10 as a diffraction lens in a form of an additional optical path length at a height h from the optical axis. More specifically, the optical path length difference function φ(h) defines positions and heights of the minute steps in the diffracting structure. The optical path length difference function φ(h) is represented by the following equation:

$$\phi(h) = m\lambda \sum_{i=1} P_{2i} h^{2i}$$

where P2i represents 2i-th (where i is an integer) coefficient, m represents the diffraction order at which the use efficiency of light of the laser beam is maximized, and λ represents a design wavelength of the laser beam being used.

The phase shift structure provided on the objective lens 10 is configured to give an optical path length difference approximately equal to $2\lambda_1$ (where $\lambda_1$ is the first wavelength) or approximately equal to $10\lambda_1$ to the first laser beam. That is, the phase shift structure is represented by assigning the first wavelength to λ and assigning 2 or 10 to m in the above function φ(h). By thus assigning the above described values to the function φ(h), it becomes possible to suitably correct the longitudinal chromatic aberration caused when the optical disc D1 having the lowest tolerance to aberrations is used. In particular, if the phase shift structure is configured to give an additional optical path length approximately equal to $2\lambda_1$ to the first laser beam, it is possible to keep the use efficiency of light at a high level for each of the first to third laser beams and to prevent the use efficiency of light from decreasing when fluctuation of the wavelength occurs.

Hereafter, four concrete examples (first to fourth examples) of the optical information recording/reproducing device 100 having the objective lens 10 are described. The optical information recording/reproducing device 100 according to each of the first to fourth examples has the configuration shown in FIGS. 1 and 2A to 2C. In each example, an aperture stop is used to obtain a suitable numerical aperture for the recording and reproducing operations for the optical disc D3. Therefore, as show in FIGS. 2A to 2C, the beam diameter for the optical disc D3 is smaller than that for the optical disc D1 or D2.

In the following examples, the optical disc D1 having the highest recording density has the protective layer thickness of 0.6 mm, the optical disc D2 having the second highest recording density has the protective layer thickness of 0.6 mm, and the optical disc D3 having the lowest recording density has the protective layer thickness of 1.2 mm.

FIRST EXAMPLE

The following Table 1 shows concrete specifications of the objective lens 10 according to a first example.

TABLE 1

|  | 1st laser beam | 2nd laser beam | 3rd laser beam |
| --- | --- | --- | --- |
| Wavelength (nm) | 405 | 660 | 790 |
| Focal Length (mm) | 3.00 | 3.11 | 3.13 |
| NA | 0.65 | 0.63 | 0.47 |
| Magnification M | 0.000 | 0.000 | −0.063 |

As indicated by the "Magnification M" in Table 1, the laser beam is incident upon the objective lens 10 as a collimated beam when the optical discs D1 and D2 are used, and the laser beam is incident on the objective lens 10 as a diverging beam when the optical disc D3 is used. As shown in Table 1, in the optical information recording/reproducing device 100 according to the first example, both of f1×M1 and f2×M2 are 0.00 and f3×M3 is −0.197. Therefore, the optical information recording/reproducing device 100 satisfies the conditions (7) to (9).

Table 2 shows specific numerical configuration defined when the optical disc D1 is used in the optical information recording/reproducing device 100 provided with the objective lens 10 having the specifications shown in Table 1. The following Table 3 shows specific numerical configuration defined when the optical disc D2 is used in the optical information recording/reproducing device 100 provided with the objective lens 10 having the specifications shown in Table 1. The following Table 4 shows specific numerical configuration defined when the optical disc D3 is used in the optical information recording/reproducing device 100 provided with the objective lens 10 having the specifications shown in Table 1.

TABLE 2

| Surface No. | r | d | n(405 nm) | Comments |
| --- | --- | --- | --- | --- |
| 0 |  | 2.81 |  | light source |
| 1 | ∞ | 2.00 | 1.52972 | diffraction grating |
| 2 | ∞ | 13.00 |  |  |
| 3 | 85.710 | 1.50 | 1.52469 | coupling lens |
| 4 | −10.550 | 1.00 |  |  |
| 5 | ∞ | 4.00 | 1.52972 | beam splitter |
| 6 | ∞ | 1.00 |  |  |
| 7 | ∞ | 4.00 | 1.52972 | beam splitter |
| 8 | ∞ | 3.09 |  |  |
| 9 | 1.936 | 0.10 | 1.53212 | objective lens |
| 10 | 3.108 | 2.30 | 1.56023 |  |
| 11 | −6.369 | 1.32 |  |  |
| 12 | ∞ | 0.60 | 1.62231 | optical disc |
| 13 | ∞ | — |  |  |

TABLE 3

| Surface No. | r | d | n(660 nm) | Comments |
| --- | --- | --- | --- | --- |
| 0 |  | 2.79 |  | light source |
| 1 | ∞ | 2.00 | 1.51374 | diffraction grating |
| 2 | ∞ | 13.00 |  |  |
| 3 | 101.820 | 1.50 | 1.54044 | coupling lens |
| 4 | −10.700 | 1.00 |  |  |
| 5 | ∞ | 4.00 | 1.51374 | beam splitter |
| 6 | ∞ | 1.00 |  |  |

TABLE 3-continued

| Surface No. | r | d | n(660 nm) | Comments |
| --- | --- | --- | --- | --- |
| 7 | ∞ | 4.00 | 1.51374 | beam splitter |
| 8 | ∞ | 3.00 |  |  |
| 9 | 1.936 | 0.10 | 1.51073 | objective lens |
| 10 | 3.108 | 2.30 | 1.54044 |  |
| 11 | −6.369 | 1.41 |  |  |
| 12 | ∞ | 0.60 | 1.57961 | optical disc |
| 13 | ∞ | — |  |  |

TABLE 4

| Surface No. | r | d | n(790 nm) | Comments |
| --- | --- | --- | --- | --- |
| 0 |  | 1.77 |  | light source |
| 1 | ∞ | 2.00 | 1.51052 | diffraction grating |
| 2 | ∞ | 11.00 |  |  |
| 3 | −29.990 | 1.50 | 1.53653 | coupling Lens |
| 4 | −9.430 | 5.93 |  |  |
| 5 | ∞ | 4.00 | 1.51052 | beam splitter |
| 6 | ∞ | 3.17 |  |  |
| 7 | 1.936 | 0.10 | 1.50741 | objective lens |
| 8 | 3.108 | 2.30 | 1.53653 |  |
| 9 | −6.369 | 1.24 |  |  |
| 10 | ∞ | 1.20 | 1.57307 | optical disc |
| 11 | ∞ | — |  |  |

In Tables 2 to 4, "r" denotes the curvature radius [mm] of each optical surface, "d" denotes the distance [mm] from each optical surface to the next optical surface during the information reproduction/recordation, "n (X nm)" denotes the refractive index of a medium between each optical surface and the next optical surface for a wavelength of X nm (ditto for the similar Tables explained later).

As shown in the "Comments" in Tables 2 to 4 (and in the following similar Tables), the surface No. 0 represents the light source (1A, 1B, 1C), the surfaces Nos. 1 and 2 represent surfaces of the diffraction grating (2A, 2B, 2C), and the surfaces Nos. 3 and 4 represent surfaces of the coupling lens (3A, 3B, 3C). In Tables 2 and 3, the surfaces Nos. 5 and 6 represent surfaces of the beam splitter 41, surfaces Nos. 7 and 8 represent surfaces of the beam splitter 42, surfaces Nos. 9, 10 and 11 respectively represent the surfaces 11, 13 and 12 of the objective lens 10, and the surfaces 12 and 13 represent the protective layer 21 and the record surface 22 of the optical disc (D1, D2). In Table 4, the surfaces Nos. 5 and 6 represent surfaces of the beam splitter 42, surfaces Nos. 7, 8 and 9 respectively represent the surfaces 11, 13 and 12 of the objective lens 10, and the surfaces 10 and 11 represent the protective layer 21 and the record surface 22 of the optical disc (D3).

Each of the surface No. 4 (i.e., a second surface of each of the coupling lenses 3A, 3B and 3C), and the first surface 11, the second surface 12 and the cementing surface 13 of the objective lens 10 is an aspherical surface. The following Table 5 shows the cone constant and aspherical coefficients specifying the shape of each aspherical surface (Nos. 4,9,10,11) when the optical disc D1 is used. The following Table 6 shows the cone constant and aspherical coefficients specifying the shape of each aspherical surface (Nos. 4,9,10,11) when the optical disc D2 is used. The following Table 7 shows the cone constant and aspherical coefficients specifying the shape of each aspherical surface (Nos. 4,7,8,9) when the optical disc D3 is used. Incidentally, the notation "E" in Tables 5-7 (and in the following similar Tables) means the power of 10 with an exponent specified by the number to the right of E (e.g. "E−04" means "×10$^{-4}$").

TABLE 5

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6800 | 8.5260E−04 | 1.5280E−03 | −1.1550E−03 | 3.6840E−04 | −4.3400E−05 |
| 10 | −0.6800 | 4.4950E−02 | −2.6080E−02 | 2.1860E−02 | −6.5890E−03 | 8.2160E−04 |
| 11 | 0.0000 | 2.8570E−02 | −1.1970E−02 | 5.4460E−03 | −1.8360E−03 | 2.4140E−04 |

TABLE 6

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6800 | 8.5260E−04 | 1.5280E−03 | −1.1550E−03 | 3.6840E−04 | −4.3400E−05 |
| 10 | −0.6800 | 4.4950E−02 | −2.6080E−02 | 2.1860E−02 | −6.5890E−03 | 8.2160E−04 |
| 11 | 0.0000 | 2.8570E−02 | −1.1970E−02 | 5.4460E−03 | −1.8360E−03 | 2.4140E−04 |

TABLE 7

| Surface No. | K | A4 | A6 | A8 | A10 | A12 |
|---|---|---|---|---|---|---|
| 4 | 0.0000 | 1.9800E−05 | 2.2280E−07 | 0.0000E+00 | 0.0000E+00 | 0.0000E+00 |
| 7 | −0.6800 | 8.5260E−04 | 1.5280E−03 | −1.1550E−03 | 3.6840E−04 | −4.3400E−05 |
| 8 | −0.6800 | 4.4950E−02 | −2.6080E−02 | 2.1860E−02 | −6.5890E−03 | 8.2160E−04 |
| 9 | 0.0000 | 2.8570E−02 | −1.1970E−02 | 5.4460E−03 | −1.8360E−03 | 2.4140E−04 |

As can be seen from the above described Tables, the intermediate term of each of the conditions (1) and (2) takes a value of 0.018. Therefore, the optical information recording/reproducing device 100 according to the first example satisfies the conditions (1) and (2). In the optical information recording/reproducing device 100 according to the first example, the Abbe number vd2 of the optical element 10B is 58. Therefore, the condition (3) is satisfied.

In the first example, RK1 and RK2 regarding the condition (5) take values of 1.078 and 0.567, respectively (h1=1.950, h2=1.849). In this case, RK1/RK2 takes a value of 0.525. Therefore, the condition (5) is satisfied. Since d1/d2 takes a value of 0.043, the condition (6) is also satisfied.

Figure 4A:
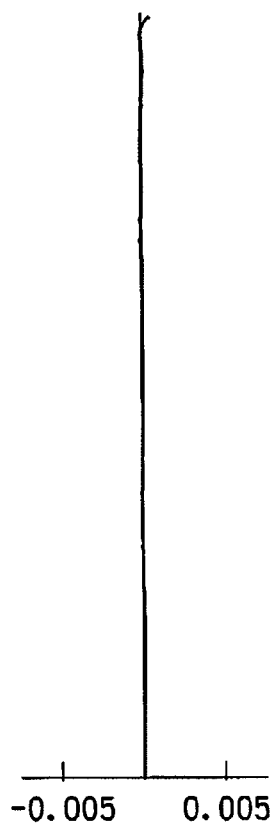
FIG. 4A is a graph illustrating the spherical aberration caused when a first laser beam for the optical disc D1 is used in the optical information recording/reproducing device according to a first example.
Figure 4B:
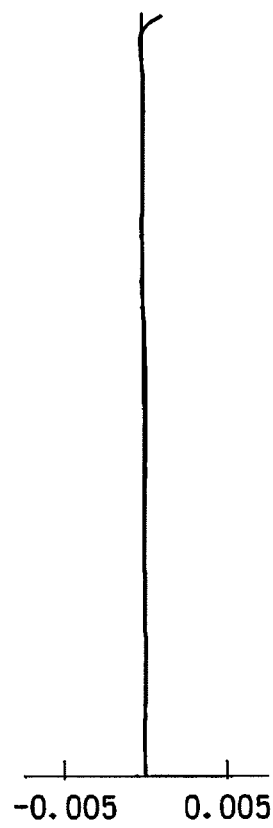
FIG. 4B is a graph illustrating the spherical aberration caused when a second laser beam for the optical disc D2 is used in the optical information recording/reproducing device according to the first example.
Figure 4C:
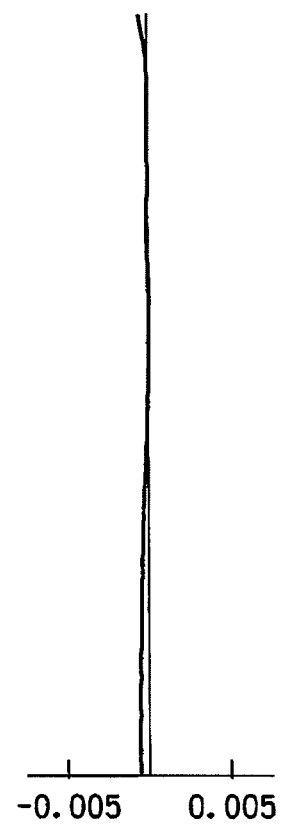
FIG. 4C is a graph illustrating the spherical aberration caused when a third laser beam is used in the optical information recording/reproducing device according to the first example.

FIG. 4A is a graph illustrating the spherical aberration caused when the first laser beam is used in the optical information recording/reproducing device 100 according to the first example. FIG. 4B is a graph illustrating the spherical aberration caused when the second laser beam is used in the optical information recording/reproducing device 100 according to the first example. FIG. 4C is a graph illustrating the spherical aberration caused when the third laser beam is used in the optical information recording/reproducing device 100 according to the first example.

As shown in FIGS. 4A-4C, the spherical aberration is sufficiently corrected when the reading or reproducing operation is performed for each of the optical discs D1-D3. Therefore, in the optical information recording/reproducing device 100, a beam spot suitable for the reading or reproducing operation can be formed on the record surface 22 of each of the optical discs D1-D3.

SECOND EXAMPLE

The following Table 8 shows concrete specifications of the objective lens 10 according to a second example.

TABLE 8

| | 1st laser beam | 2nd laser beam | 3rd laser beam |
|---|---|---|---|
| Wavelength (nm) | 405 | 660 | 790 |
| Focal Length (mm) | 3.00 | 3.08 | 3.10 |
| NA | 0.65 | 0.63 | 0.47 |
| Magnification M | 0.000 | 0.000 | −0.058 |

As shown in Table 8, in the optical information recording/reproducing device 100 according to the second example, both of f1×M1 and f2×M2 are 0.00 and f3×M3 is −0.180. Therefore, the optical information recording/reproducing device 100 satisfies the conditions (7) to (9).

Table 9 shows specific numerical configuration defined when the optical disc D1 is used in the optical information recording/reproducing device 100 provided with the objective lens 10 having the specifications shown in Table 8. The following Table 10 shows specific numerical configuration defined when the optical disc D2 is used in the optical information recording/reproducing device 100 provided with the objective lens 10 having the specifications shown in Table 8. The following Table 11 shows specific numerical configuration defined when the optical disc D3 is used in the optical information recording/reproducing device 100 provided with the objective lens 10 having the specifications shown in Table 8.

TABLE 9

| Surface No. | r | d | n(405 nm) | Comments |
|---|---|---|---|---|
| 0 | | 2.81 | | light source |
| 1 | ∞ | 2.00 | 1.52972 | diffraction grating |
| 2 | ∞ | 13.00 | | |

TABLE 9-continued

| Surface No. | r | d | n(405 nm) | Comments |
|---|---|---|---|---|
| 3 | 85.710 | 1.50 | 1.52469 | coupling lens |
| 4 | −10.550 | 1.00 | | |
| 5 | ∞ | 4.00 | 1.52972 | beam splitter |
| 6 | ∞ | 1.00 | | |
| 7 | ∞ | 4.00 | 1.52972 | beam splitter |
| 8 | ∞ | 3.06 | | |
| 9 | 1.834 | 0.10 | 1.53212 | objective lens |
| 10 | 2.033 | 2.30 | 1.49895 | |
| 11 | −4.723 | 1.31 | | |
| 12 | ∞ | 0.60 | 1.62231 | optical disc |
| 13 | ∞ | — | | |

TABLE 10

| Surface No. | r | d | n(660 nm) | Comments |
|---|---|---|---|---|
| 0 | | 2.79 | | light source |
| 1 | ∞ | 2.00 | 1.51374 | diffraction grating |
| 2 | ∞ | 13.00 | | |
| 3 | 101.820 | 1.50 | 1.54044 | coupling lens |
| 4 | −10.700 | 1.00 | | |
| 5 | ∞ | 4.00 | 1.51374 | beam splitter |
| 6 | ∞ | 1.00 | | |
| 7 | ∞ | 4.00 | 1.51374 | beam splitter |
| 8 | ∞ | 3.00 | | |
| 9 | 1.834 | 0.10 | 1.51073 | objective lens |
| 10 | 2.033 | 2.30 | 1.48525 | |
| 11 | −4.723 | 1.37 | | |
| 12 | ∞ | 0.60 | 1.57961 | optical disc |
| 13 | ∞ | — | | |

TABLE 11

| Surface No. | r | d | n(790 nm) | Comments |
|---|---|---|---|---|
| 0 | | 2.58 | | light source |
| 1 | ∞ | 2.00 | 1.51052 | diffraction grating |
| 2 | ∞ | 11.00 | | |
| 3 | −34.840 | 1.50 | 1.53653 | coupling lens |
| 4 | −9.830 | 3.84 | | |
| 5 | ∞ | 4.00 | 1.51052 | beam splitter |
| 6 | ∞ | 3.18 | | |
| 7 | 1.834 | 0.10 | 1.50741 | objective lens |
| 8 | 2.033 | 2.30 | 1.48243 | |
| 9 | −4.723 | 1.19 | | |
| 10 | ∞ | 1.20 | 1.57307 | optical disc |
| 11 | ∞ | — | | |

Each of the surface No. 4 (i.e., a second surface of each of the coupling lenses 3A, 3B and 3C), and the first surface 11, the second surface 12 and the cementing surface 13 of the objective lens 10 is an aspherical surface. The following Table 12 shows the cone constant and aspherical coefficients specifying the shape of each aspherical surface (Nos. 4,9,10,11) when the optical disc D1 is used. The following Table 13 shows the cone constant and aspherical coefficients specifying the shape of each aspherical surface (Nos. 4,9,10,11) when the optical disc D2 is used. The following Table 14 shows the cone constant and aspherical coefficients specifying the shape of each aspherical surface (Nos. 4,7,8,9) when the optical disc D3 is used.

TABLE 12

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6800 | 4.2420E−03 | 6.1290E−04 | 1.2500E−04 | −6.1460E−05 | 1.7180E−05 |
| 10 | −0.6800 | 1.4100E−02 | 2.5480E−03 | 1.4610E−03 | −9.8770E−04 | 2.5260E−04 |
| 11 | 0.0000 | 4.1210E−02 | −1.4050E−02 | 3.9030E−03 | −4.1500E−04 | −8.8360E−06 |

TABLE 13

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6800 | 4.2420E−03 | 6.1290E−04 | 1.2500E−04 | −6.1460E−05 | 1.7180E−05 |
| 10 | −0.6800 | 1.4100E−02 | 2.5480E−03 | 1.4610E−03 | −9.8770E−04 | 2.5260E−04 |
| 11 | 0.0000 | 4.1210E−02 | −1.4050E−02 | 3.9030E−03 | −4.1500E−04 | −8.8360E−06 |

TABLE 14

| Surface No. | K | A4 | A6 | A8 | A10 | A12 |
|---|---|---|---|---|---|---|
| 4 | 0.0000 | 2.1330E−05 | 2.1550E−07 | 0.0000E+00 | 0.0000E+00 | 0.0000E+00 |
| 7 | −0.6800 | 4.2420E−03 | 6.1290E−04 | 1.2500E−04 | −6.1460E−05 | 1.7180E−05 |
| 8 | −0.6800 | 1.4100E−02 | 2.5480E−03 | 1.4610E−03 | −9.8770E−04 | 2.5260E−04 |
| 9 | 0.0000 | 4.1210E−02 | −1.4050E−02 | 3.9030E−03 | −4.1500E−04 | −8.8360E−06 |

As can be seen from the above described Tables, the intermediate term of each of the conditions (1) and (2) takes a value of 0.024. Therefore, the optical information recording/reproducing device 100 according to the second example satisfies the conditions (1) and (2). In the optical information recording/reproducing device 100 according to the second example, the Abbe number vd2 of the optical element 10B is 58. Therefore, the condition (3) is satisfied. In the second example, the left term of the condition (4) takes a value of 0.008. Therefore, the condition (4) is satisfied.

In the second example, RK1 and RK2 regarding the condition (5) take values of 1.153 and 0.921, respectively (h1=1.950, h2=1.864). In this case, RK1/RK2 takes a value of 0.779. Therefore, the condition (5) is satisfied. Since d1/d2 takes a value of 0.043, the condition (6) is also satisfied. That is, the optical information recording/reproducing device 100 according to the second example satisfies all of the conditions (1) to (9).

Figure 5A:
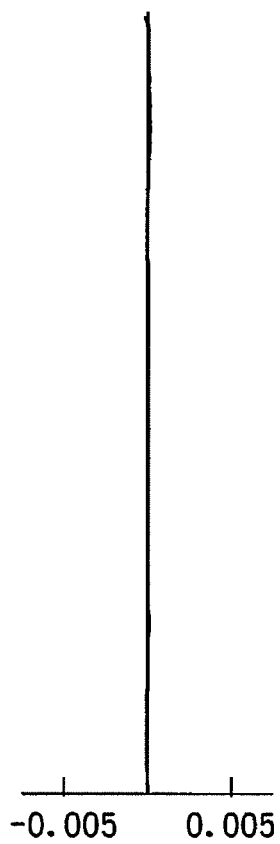
FIG. 5A is a graph illustrating the spherical aberration caused when the first laser beam is used in the optical information recording/reproducing device according to a second example.
Figure 5B:
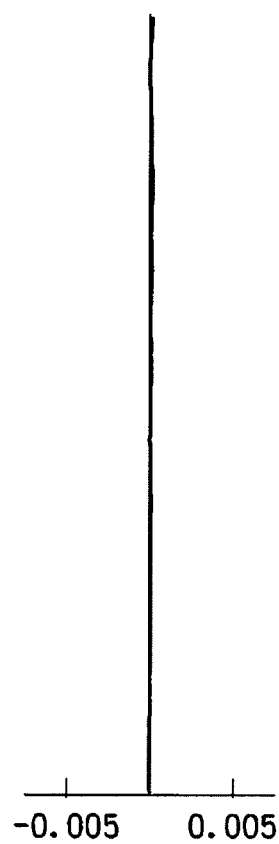
FIG. 5B is a graph illustrating the spherical aberration caused when the second laser beam is used in the optical information recording/reproducing device according to the second example.
Figure 5C:
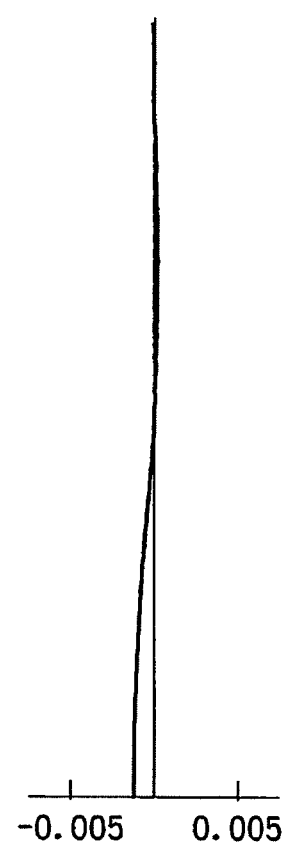
FIG. 5C is a graph illustrating the spherical aberration caused when the third laser beam is used in the optical information recording/reproducing device according to the second example.

FIG. 5A is a graph illustrating the spherical aberration caused when the first laser beam is used in the optical information recording/reproducing device 100 according to the second example. FIG. 5B is a graph illustrating the spherical aberration caused when the second laser beam is used in the optical information recording/reproducing device 100 according to the second example. FIG. 5C is a graph illustrating the spherical aberration caused when the third laser beam is used in the optical information recording/reproducing device 100 according to the second example.

As shown in FIGS. 5A-5C, the spherical aberration is sufficiently corrected for the reading or reproducing operation for each of the optical discs D1-D3. Therefore, in the optical information recording/reproducing device 100, a beam spot suitable for the reading or reproducing operation can be formed on the record surface 22 of each of the optical discs D1-D3.

THIRD EXAMPLE

The following Table 15 shows concrete specifications of the objective lens 10 according to a third example.

TABLE 15

|  | 1st laser beam | 2nd laser beam | 3rd laser beam |
|---|---|---|---|
| Wavelength (nm) | 405 | 660 | 790 |
| Focal Length (mm) | 3.00 | 3.09 | 3.10 |
| NA | 0.65 | 0.63 | 0.47 |
| Magnification M | 0.000 | 0.000 | −0.055 |

As shown in Table 15, in the optical information recording/reproducing device 100 according to the third example, both of f1×M1 and f2×M2 are 0.00 and f3×M3 is −0.171. Therefore, the optical information recording/reproducing device 100 satisfies the conditions (7) to (9).

Table 16 shows specific numerical configuration defined when the optical disc D1 is used in the optical information recording/reproducing device 100 provided with the objective lens 10 having the specifications shown in Table 15. The following Table 17 shows specific numerical configuration defined when the optical disc D2 is used in the optical information recording/reproducing device 100 provided with the objective lens 10 having the specifications shown in Table 15. The following Table 18 shows specific numerical configuration defined when the optical disc D3 is used in the optical information recording/reproducing device 100 provided with the objective lens 10 having the specifications shown in Table 15.

TABLE 16

| Surface No. | r | d | n(405 nm) | Comments |
|---|---|---|---|---|
| 0 |  | 2.81 |  | light source |
| 1 | ∞ | 2.00 | 1.52972 | diffraction grating |
| 2 | ∞ | 13.00 |  |  |
| 3 | 85.710 | 1.50 | 1.52469 | coupling lens |
| 4 | −10.550 | 1.00 |  |  |
| 5 | ∞ | 4.00 | 1.52972 | beam splitter |
| 6 | ∞ | 1.00 |  |  |
| 7 | ∞ | 4.00 | 1.52972 | beam splitter |
| 8 | ∞ | 3.07 |  |  |
| 9 | 1.869 | 0.10 | 1.71070 | objective lens |
| 10 | 1.810 | 2.30 | 1.52972 |  |
| 11 | −5.763 | 1.29 |  |  |
| 12 | ∞ | 0.60 | 1.62231 | optical disc |
| 13 | ∞ | — |  |  |

TABLE 17

| Surface No. | r | d | n(660 nm) | Comments |
|---|---|---|---|---|
| 0 |  | 2.79 |  | light source |
| 1 | ∞ | 2.00 | 1.51374 | diffraction grating |
| 2 | ∞ | 13.00 |  |  |
| 3 | 101.820 | 1.50 | 1.54044 | coupling lens |
| 4 | −10.700 | 1.00 |  |  |
| 5 | ∞ | 4.00 | 1.51374 | beam splitter |
| 6 | ∞ | 1.00 |  |  |
| 7 | ∞ | 4.00 | 1.51374 | beam splitter |
| 8 | ∞ | 3.00 |  |  |
| 9 | 1.869 | 0.10 | 1.66632 | objective lens |
| 10 | 1.810 | 2.30 | 1.51374 |  |
| 11 | −5.763 | 1.36 |  |  |
| 12 | ∞ | 0.60 | 1.57961 | optical disc |
| 13 | ∞ | — |  |  |

TABLE 18

| Surface No. | r | d | n(790 nm) | Comments |
|---|---|---|---|---|
| 0 |  | 2.07 |  | light source |
| 1 | ∞ | 2.00 | 1.51052 | diffraction grating |
| 2 | ∞ | 12.00 |  |  |
| 3 | −38.770 | 1.50 | 1.53653 | coupling lens |
| 4 | −10.100 | 3.00 |  |  |
| 5 | ∞ | 4.00 | 1.51052 | beam splitter |
| 6 | ∞ | 3.20 |  |  |
| 7 | 1.869 | 0.10 | 1.65903 | objective lens |
| 8 | 1.810 | 2.30 | 1.51052 |  |
| 9 | −5.763 | 1.16 |  |  |
| 10 | ∞ | 1.20 | 1.57307 | optical disc |
| 11 | ∞ | — |  |  |

Each of the surface No. 4 (i.e., a second surface of each of the coupling lenses 3A, 3B and 3C), and the first surface 11, the second surface 12 and the cementing surface 13 of the objective lens 10 is an aspherical surface. The following Table 19 shows the cone constant and aspherical coefficients specifying the shape of each aspherical surface (Nos. 4,9,10,11) when the optical disc D1 is used. The following Table 20 shows the cone constant and aspherical coefficients specifying the shape of each aspherical surface (Nos. 4,9,10,11) when the optical disc D2 is used. The following Table 21 shows the cone constant and aspherical coefficients specifying the shape of each aspherical surface (Nos. 4,7,8,9) when the optical disc D3 is used.

TABLE 19

| Surface No. | K | A4 | A6 | A8 | A10 | A12 |
|---|---|---|---|---|---|---|
| 4  | 0.0000  | 7.8520E−05 | 5.3350E−07  | 0.0000E+00  | 0.0000E+00  | 0.0000E+00 |
| 9  | −0.6800 | 5.2560E−03 | 9.8730E−04  | −1.0980E−04 | −2.8700E−05 | 2.7762E−05 |
| 10 | −0.6800 | 9.1440E−03 | 2.9910E−03  | −7.4060E−04 | −2.9810E−05 | 1.0790E−04 |
| 11 | 0.0000  | 4.0430E−02 | −1.5630E−02 | 3.4220E−03  | 1.0630E−03  | −3.7080E−04 |

TABLE 20

| Surface No. | K | A4 | A6 | A8 | A10 | A12 |
|---|---|---|---|---|---|---|
| 4  | 0.0000  | 7.3130E−05 | 4.8300E−07  | 0.0000E+00  | 0.0000E+00  | 0.0000E+00 |
| 9  | −0.6800 | 5.2560E−03 | 9.8730E−04  | −1.0980E−04 | −2.8700E−05 | 2.7762E−05 |
| 10 | −0.6800 | 9.1440E−03 | 2.9910E−03  | −7.4060E−04 | −2.9810E−05 | 1.0790E−04 |
| 11 | 0.0000  | 4.0430E−02 | −1.5630E−02 | 3.4220E−03  | 1.0630E−03  | −3.7080E−04 |

TABLE 21

| Surface No. | K | A4 | A6 | A8 | A10 | A12 |
|---|---|---|---|---|---|---|
| 4 | 0.0000  | 2.2030E−05 | 2.0980E−07  | 0.0000E+00  | 0.0000E+00  | 0.0000E+00 |
| 7 | −0.6800 | 5.2560E−03 | 9.8730E−04  | −1.0980E−04 | −2.8700E−05 | 2.7762E−05 |
| 8 | −0.6800 | 9.1440E−03 | 2.9910E−03  | −7.4060E−04 | −2.9810E−05 | 1.0790E−04 |
| 9 | 0.0000  | 4.0430E−02 | −1.5630E−02 | 3.4220E−03  | 1.0630E−03  | −3.7080E−04 |

As can be seen from the above described Tables, the intermediate term of each of the conditions (1) and (2) takes a value of 0.033. Therefore, the optical information recording/reproducing device 100 according to the third example satisfies the condition (1). In the optical information recording/reproducing device 100 according to the third example, the Abbe number vd2 of the optical element 10B is 64. Therefore, the condition (3) is satisfied. In the third example, the left term of the condition (4) takes a value of 0.028. Therefore, the condition (4) is satisfied.

In the third example, RK1 and RK2 regarding the condition (5) take values of 1.126 and 1.051, respectively (h1=1.950, h2=1.858). In this case, RK1/RK2 takes a value of 0.934. Therefore, the condition (5) is satisfied. Since d1/d2 takes a value of 0.043, the condition (6) is also satisfied.

Figure 6A:
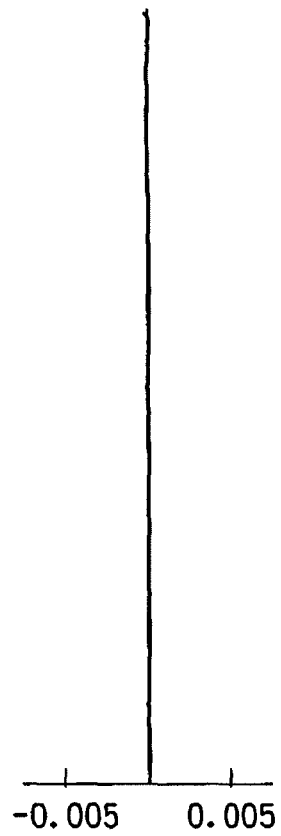
FIG. 6A is a graph illustrating the spherical aberration caused when the first laser beam is used in the optical information recording/reproducing device according to a third example.
Figure 6B:
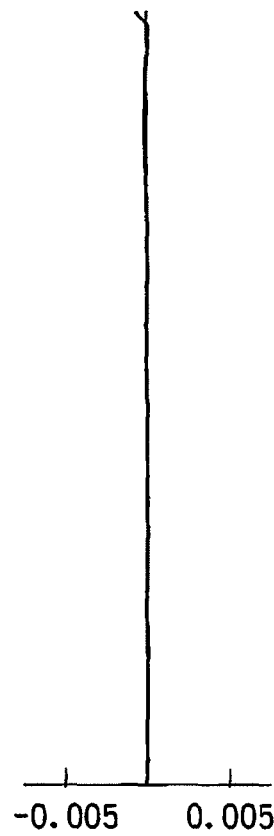
FIG. 6B is a graph illustrating the spherical aberration caused when the second laser beam is used in the optical information recording/reproducing device according to the third example.
Figure 6C:
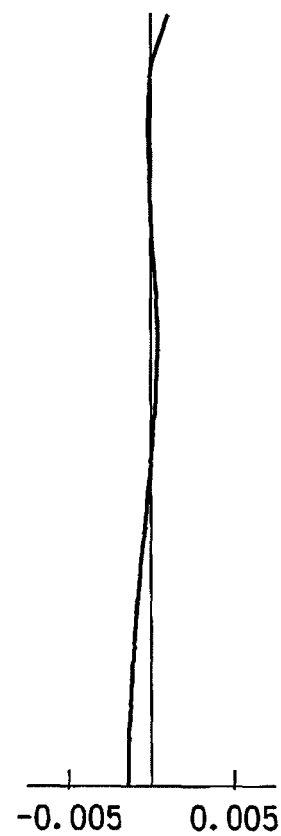
FIG. 6C is a graph illustrating the spherical aberration caused when the third laser beam is used in the optical information recording/reproducing device according to the third example.

FIG. 6A is a graph illustrating the spherical aberration caused when the first laser beam is used in the optical information recording/reproducing device 100 according to the third example. FIG. 6B is a graph illustrating the spherical aberration caused when the second laser beam is used in the optical information recording/reproducing device 100 according to the third example. FIG. 6C is a graph illustrating the spherical aberration caused when the third laser beam is used in the optical information recording/reproducing device 100 according to the third example.

As shown in FIGS. 6A-6C, the spherical aberration is sufficiently corrected for the reading or reproducing operation for each of the optical discs D1-D3. Therefore, in the optical information recording/reproducing device 100, a beam spot suitable for the reading or reproducing operation can be formed on the record surface 22 of each of the optical discs D1-D3.

FOURTH EXAMPLE

In contrast to the above mentioned examples, the objective lens 10 according to a fourth example is configured to have a phase shift structure of the first surface 11. The following Table 22 shows concrete specifications of the objective lens 10 according to a third example.

TABLE 22

| | 1st laser beam | 2nd laser beam | 3rd laser beam |
|---|---|---|---|
| Wavelength (nm) | 405 | 660 | 790 |
| Focal Length (mm) | 3.00 | 3.21 | 3.19 |
| NA | 0.65 | 0.61 | 0.46 |
| Magnification M | 0.000 | 0.000 | −0.050 |

As shown in Table 22, in the optical information recording/reproducing device 100 according to the fourth example, both of f1×M1 and f2×M2 are 0.00 and f3×M3 is −0.160. Therefore, the optical information recording/reproducing device 100 according to the fourth example satisfies the conditions (7) to (9).

Table 23 shows specific numerical configuration defined when the optical disc D1 is used in the optical information recording/reproducing device 100 provided with the objective lens 10 having the specifications shown in Table 22. The following Table 24 shows specific numerical configuration defined when the optical disc D2 is used in the optical information recording/reproducing device 100 provided with the objective lens 10 having the specifications shown in Table 22. The following Table 25 shows specific numerical configuration defined when the optical disc D3 is used in the optical information recording/reproducing device 100 provided with the objective lens 10 having the specifications shown in Table 22.

TABLE 23

| Surface No. | r | d | n(405 nm) | Comments |
|---|---|---|---|---|
| 0 |        | 2.81  |         | light source |
| 1 | ∞      | 2.00  | 1.52972 | diffraction grating |
| 2 | ∞      | 13.00 |         |  |
| 3 | 85.710 | 1.50  | 1.52469 | coupling lens |

TABLE 23-continued

| Surface No. | r | d | n(405 nm) | Comments |
|---|---|---|---|---|
| 4 | −10.550 | 1.00 | | |
| 5 | ∞ | 4.00 | 1.52972 | beam splitter |
| 6 | ∞ | 1.00 | | |
| 7 | ∞ | 4.00 | 1.52972 | beam splitter |
| 8 | ∞ | 3.18 | | |
| 9 | 2.270 | 0.20 | 1.71070 | objective lens |
| 10 | 2.540 | 1.70 | 1.76250 | |
| 11 | 14.603 | 1.45 | | |
| 12 | ∞ | 0.60 | 1.62231 | optical disc |
| 13 | ∞ | — | | |

TABLE 24

| Surface No. | r | d | n(660 nm) | Comments |
|---|---|---|---|---|
| 0 | | 2.79 | | light source |
| 1 | ∞ | 2.00 | 1.51374 | diffraction grating |
| 2 | ∞ | 13.00 | | |
| 3 | 101.820 | 1.50 | 1.54044 | coupling lens |
| 4 | −10.700 | 1.00 | | |
| 5 | ∞ | 4.00 | 1.51374 | beam splitter |
| 6 | ∞ | 1.00 | | |
| 7 | ∞ | 4.00 | 1.51374 | beam splitter |
| 8 | ∞ | 3.00 | | |
| 9 | 2.270 | 0.20 | 1.66632 | objective lens |
| 10 | 2.540 | 1.70 | 1.72516 | |
| 11 | 14.603 | 1.63 | | |
| 12 | ∞ | 0.60 | 1.57961 | optical disc |
| 13 | ∞ | — | | |

TABLE 25

| Surface No. | r | d | n(790 nm) | Comments |
|---|---|---|---|---|
| 0 | | 2.88 | | light source |
| 1 | ∞ | 2.00 | 1.51052 | diffraction grating |
| 2 | ∞ | 12.00 | | |
| 3 | −46.340 | 1.50 | 1.53653 | coupling lens |
| 4 | −10.520 | 3.27 | | |
| 5 | ∞ | 4.00 | 1.51052 | beam splitter |
| 6 | ∞ | 3.26 | | |
| 7 | 2.270 | 0.20 | 1.65903 | objective lens |
| 8 | 2.540 | 1.70 | 1.71858 | |
| 9 | 14.603 | 1.37 | | |
| 10 | ∞ | 1.20 | 1.57307 | optical disc |
| 11 | ∞ | — | | |

Each of the surface No. 4 (i.e., a second surface of each of the coupling lenses 3A, 3B and 3C), and the first surface 11, the second surface 12 and the cementing surface 13 of the objective lens 10 is an aspherical surface. The following Table 19 shows the cone constant and aspherical coefficients specifying the shape of each aspherical surface (Nos. 4,9,10,11) when the optical disc D1 is used. The following Table 20 shows the cone constant and aspherical coefficients specifying the shape of each aspherical surface (Nos. 4,9,10,11) when the optical disc D2 is used. The following Table 21 shows the cone constant and aspherical coefficients specifying the shape of each aspherical surface (Nos. 4,7,8,9) when the optical disc D3 is used.

TABLE 26

| Surface No. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | 2.5980E−03 | 3.2400E−04 | 1.8360E−04 | −7.6330E−05 | 1.7730E−05 |
| 10 | −0.6000 | 1.3780E−02 | 5.0000E−05 | −1.1620E−03 | 9.5760E−04 | −1.2227E−04 |
| 11 | 0.0000 | 1.0020E−02 | −2.8400E−03 | 1.4050E−03 | 1.4410E−04 | −8.6900E−05 |

TABLE 27

| Surface No. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | 2.5980E−03 | 3.2400E−04 | 1.8360E−04 | −7.6330E−05 | 1.7730E−05 |
| 10 | −0.6000 | 1.3780E−02 | 5.0000E−05 | −1.1620E−03 | 9.5760E−04 | −1.2227E−04 |
| 11 | 0.0000 | 1.0020E−02 | −2.8400E−03 | 1.4050E−03 | 1.4410E−04 | −8.6900E−05 |

TABLE 28

| Surface No. | K | A4 | A6 | A8 | A10 | A12 |
|---|---|---|---|---|---|---|
| 4 | 0.0000 | 2.3100E−05 | 1.9800E−07 | 0.0000E+00 | 0.0000E+00 | 0.0000E+00 |
| 7 | −0.6000 | 2.5980E−03 | 3.2400E−04 | 1.8360E−04 | −7.6330E−05 | 1.7730E−05 |
| 8 | −0.6000 | 1.3780E−02 | 5.0000E−05 | −1.1620E−03 | 9.5760E−04 | −1.2227E−04 |
| 9 | 0.0000 | 1.0020E−02 | −2.8400E−03 | 1.4050E−03 | 1.4410E−04 | −8.6900E−05 |

The coefficients $P_2 \ldots$ of the optical path length difference function defining the phase shift structure formed on the first surface 11 of the objective lens 10 according to the fourth example are shown in the following Table 29. Table 30 shows the diffraction order m at which the diffraction efficiency is maximized for each of the first to third laser beams.

TABLE 29

| | P2 | P4 | P6 | P8 | P10 | P12 |
|---|---|---|---|---|---|---|
| first surface of the objective lens | −2.0000E+01 | −8.0000E−01 | 0.0000E+00 | 0.0000E+00 | 0.0000E+00 | 0.0000E+00 |

TABLE 30

| | first laser beam | second laser beam | third laser beam |
|---|---|---|---|
| diffraction order m | 2 | 1 | 1 |

As can be seen from the above described Tables, the intermediate term of each of the conditions (1) and (2) takes a value of 0.030. Therefore, the optical information recording/reproducing device 100 according to the fourth example satisfies the condition (1). In the optical information recording/reproducing device 100 according to the fourth example, the Abbe number vd2 of the optical element 10B is 41. Therefore, the condition (3) is satisfied. In the fourth example, the left term of the condition (4) takes a value of 0.007. Therefore, the condition (4) is satisfied.

In the fourth example, RK1 and RK2 regarding the condition (5) take values of 0.911 and 0.720, respectively (h1=1.950, h2=1.858). In this case, RK1/RK2 takes a value of 0.791. Therefore, the condition (5) is satisfied. Since d1/d2 takes a value of 0.118, the condition (6) is also satisfied.

Figure 7A:
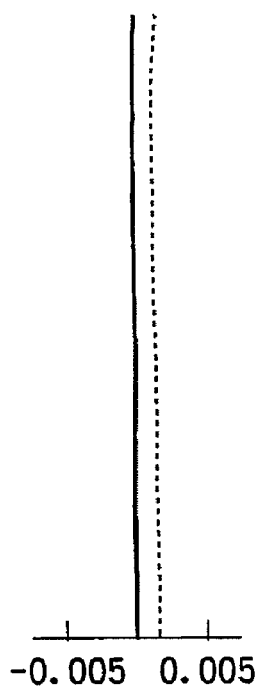
FIG. 7A is a graph illustrating the spherical aberration caused when the first laser beam is used in the optical information recording/reproducing device according to a fourth example.
Figure 7B:
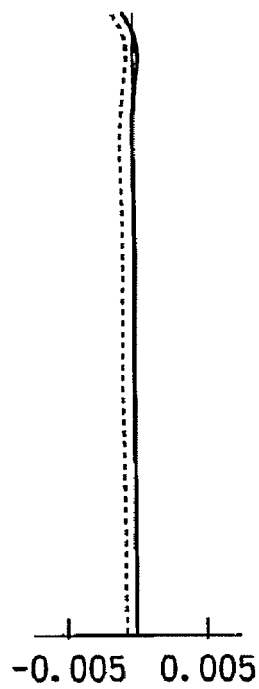
FIG. 7B is a graph illustrating the spherical aberration caused when the second laser beam is used in the optical information recording/reproducing device according to the fourth example.
Figure 7C:
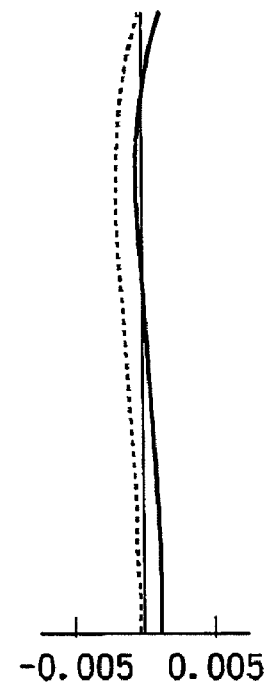
FIG. 7C is a graph illustrating the spherical aberration caused when the third laser beam is used in the optical information recording/reproducing device according to the fourth example.

FIG. 7A is a graph illustrating the spherical aberration caused when the first laser beam is used in the optical information recording/reproducing device 100 according to the fourth example. FIG. 7B is a graph illustrating the spherical aberration caused when the second laser beam is used in the optical information recording/reproducing device 100 according to the fourth example. FIG. 7C is a graph illustrating the spherical aberration caused when the third laser beam is used in the optical information recording/reproducing device 100 according to the fourth example. In each of FIGS. 7A to 7C (and in FIG. 8), a solid line represents the spherical aberration at the design wavelength, and a dashed line represents the spherical aberration at a wavelength +5 nm shifted from the design wavelength. As shown in FIGS. 7A-7C, the spherical aberration is sufficiently corrected for the reading or reproducing operation for each of the optical discs D1-D3.

Figure 8:
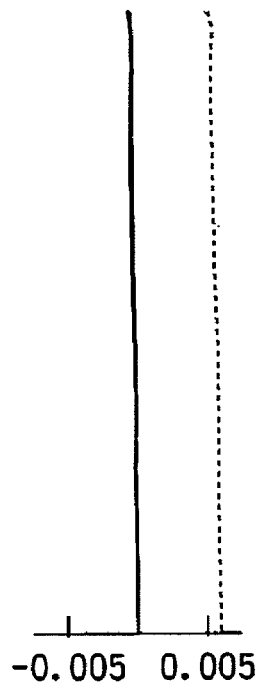
FIG. 8 is a graph illustrating the spherical aberration caused when the first laser beam is used in an optical information recording/reproducing device according to a comparative example.

FIG. 8 is a graph illustrating the spherical aberration caused when the first laser beam is used in an optical information recording/reproducing device according to a comparative example. The optical information recording/reproducing device according to the comparative example is different from the optical information recording/reproducing device 100 according to the fourth example in that the objective lens 10 does not have the phase shift structure.

By comparing FIGS. 7A to 7C with FIG. 8, it is understood that the optical information recording/reproducing device 100 according to the fourth example corrects the longitudinal chromatic aberration caused when the optical disc D1 is used in comparison with the configuration of the comparative example.

The phase shift structure provided on the objective lens 10 is configured such that the diffraction order m at which the use efficiency of light of the first laser beam is maximized is 2.

According to this configuration, the optical information recording/reproducing device 100 according to the fourth example attains high use efficiencies of light of 100%, 93% and 99% respectively for the first to third laser beams.

That is, even if the phase shift structure is formed on the objective lens 10, the optical information recording/reproducing device 100 according to the fourth example is able to keep loss of light amount to a low level and to form a beam spot on the record surface 22 of each of the optical discs D1 to D3. In addition, since the objective lens 10 is provided with the phase shift structure, the longitudinal chromatic aberration caused by very small wavelength fluctuations can be suitably corrected.

Although the present invention has been described in considerable detail with reference to certain preferred embodiments thereof, other embodiments are possible.

This application claims priority of Japanese Patent Applications No. P2006-282104, filed on Oct. 17, 2006. The entire subject matter of the application is incorporated herein by reference.

What is claimed is:

1. An objective lens used for an optical information recording/reproducing device for recording information to and/or reproducing information from two types of optical discs including a first optical disc and a second optical disc having a recording density lower than that of the first optical disc, by selectively using one of two types of substantially collimated light beams including first and second light beams, when wavelengths of the first and second light beams are respectively represented by $\lambda_1$ (nm) and $\lambda_2$ (nm), $\lambda_1 < \lambda_2$ being satisfied, the objective lens comprising:

a first optical element; and a second optical element made of material different from that of the first optical element, wherein the first and second optical elements are cemented via a cementing surface, wherein the objective lens is configured to satisfy a condition:

$$0.006 < \{(nR2 - nR1) - (nB2 - nB1)\} \times \left[\left\{\left(\frac{k2}{r2^3}\right) + 8 \times A42\right\} \times f1^3 + 2.29\right] < 0.038 \quad (1)$$

where nB1 represents a refractive index of the first optical element with respect to the wavelength $\lambda_1$, nB2 represents a refractive index of the second optical element with respect to the wavelength $\lambda_1$, nR1 represents a refractive index of the first optical element with respect to the wavelength $\lambda_2$, nR2 represents a refractive index of the second optical element with respect to the wavelength $\lambda_2$, r2 represents a radius of curvature of the cementing surface, k2 represents a conical coefficient of the cementing surface, A42 represents a fourth order aspherical coefficient of the cementing surface, and f1 represents a focal length of the objective lens defined when the first laser beam is used.

2. The objective lens according to claim 1, wherein the objective lens further satisfies a condition:

$$0.014 < \{(nR2 - nR1) - (nB2 - nB1)\} \times \left[\left\{\left(\frac{k2}{r2^3}\right) + 8 \times A42\right\} \times f1^3 + 2.29\right] < 0.028. \quad (2)$$

3. The objective lens according to claim 1, wherein when Abbe number of the second optical element at a d-ray is represented by vd2, the second optical element satisfies a condition:

$$40 \leq vd2 \leq 80 \quad (3).$$

4. The objective lens according to claim 1, wherein when a radius of curvature, a conical coefficient and an effective radius of a first surface of the first optical element are respectively represented by r1, k1 and h1, and an effective radius of the cementing surface is represented by h2, the objective lens satisfies one of following conditions (4) and (5):

$$|(nR2 - nR1) - (nB2 - nB1)| > 0.005 \quad (4)$$

$$0.50 < \frac{RK2}{RK1} < 1.30 \quad (5)$$

where $RK1 = \dfrac{(h1^2/r1)}{\left[1 + \sqrt{1 - (k1+1) \times (h1/r1)^2}\right]}$ $RK2 = \dfrac{(h2^2/r2)}{\left[1 + \sqrt{1 - 2(k1+1) \times (h2/r2)^2}\right]}.$ 5. The objective lens according to claim 1, wherein:
at least one of two surfaces of the objective lens other than the cementing surface includes a phase shift structure having a plurality of refractive surface zones concentrically formed about an optical axis of the objective lens; and
the phase shift structure is configured to give an optical path length approximately equal to $2\lambda_1$ to the first light beam in adjacent ones of the plurality of refractive surface zones.

6. The objective lens according to claim 1, wherein:
at least one of two surfaces of the objective lens other than the cementing surface includes a phase shift structure having a plurality of refractive surface zones concentrically formed about an optical axis of the objective lens; and
the phase shift structure is configured to give an optical path length approximately equal to $10\lambda_1$ to the first light beam in adjacent ones of the plurality of refractive surface zones.

7. The objective lens according to claim 1, wherein the objective lens is configured to satisfy a condition:

$$0.01 < d1/d2 < 0.20 \quad (6)$$

where d1 represents a center thickness of the first optical element, and d2 represents a center thickness of the second optical element.

8. An optical information recording/reproducing device for recording information to and/or reproducing information from three types of optical discs including a first optical disc having a highest recording density, a second optical disc having a second highest recording density and a third optical disc having a lowest recording density, by selectively using one of three types of light beams including first, second and third light beams, when wavelengths of the first to third light beams are respectively represented by $\lambda_1$ (nm), $\lambda_2$ (nm) and $\lambda_3$ (nm), $\lambda_1 < \lambda_2 < \lambda_3$ being satisfied, the optical information recording/reproducing device comprising an objective lens, wherein the objective lens comprises:

a first optical element; and a second optical element made of material different from that of the first optical element, wherein the first and second optical elements are cemented via a cementing surface, wherein the objective lens is configured to satisfy a condition:

$$0.006 < \{(nR2 - nR1) - (nB2 - nB1)\} \times \left[\left\{\left(\frac{k2}{r2^3}\right) + 8 \times A42\right\} \times f1^3 + 2.29\right] < 0.038 \quad (1)$$

where nB1 represents a refractive index of the first optical element with respect to the wavelength $\lambda_1$, nB2 represents a refractive index of the second optical element with respect to the wavelength $\lambda_1$, nR1 represents a refractive index of the first optical element with respect to the wavelength $\lambda_2$, nR2 represents a refractive index of the second optical element with respect to the wavelength $\lambda_2$, r2 represents a radius of curvature of the cementing surface, k2 represents a conical coefficient of the cementing surface, A42 represents a fourth order aspherical coefficient of the cementing surface, and f1 represents a focal length of the objective lens defined when the first laser beam is used, wherein when a thickness of a protective layer of the first optical disc requiring use of the first light beam is represented by t1 (mm), a thickness of a protective layer of the second optical disc requiring use of the second light beam is represented by t2 (mm), and a thickness of a protective layer of the third optical disc requiring use of the third light beam is represented by t3 (mm), t1≈0.6 (mm), t2≈0.6 (mm) and t3≈1.2 (mm) are satisfied, wherein when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied, wherein each of the first and second light beams is incident on the objective lens as a substantially collimated beam, and the third light beam is incident on the objective lens as a diverging beam, wherein the optical information recording/reproducing device is configured to satisfy conditions (7), (8) and (9):

$$-0.02 < f1 \times M1 < 0.02 \quad (7)$$

$$-0.02 < f2 \times M2 < 0.02 \quad (8)$$

$$-0.24 < f3 \times M3 < -0.14 \quad (9)$$

where M1 represents a magnification of the objective lens defined when the first optical disc is used, f1 (mm) represents a focal length of the objective lens defined when the first optical disc is used, M2 represents a magnification of the objective lens defined when the second optical disc is used, and f2 represents a focal length of the objective lens defined when the second optical disc is used, M3 represents a magnification of the objective lens defined when the third optical disc is used, and f3 represents a focal length of the objective lens defined when the third optical disc is used.

9. The optical information recording/reproducing device according to claim 8, wherein the objective lens further satisfies a condition:

$$0.014 < \{(nR2 - nR1) - (nB2 - nB1)\} \times \quad (2)$$

$$\left[ \left\{ \left( \frac{k2}{r2^3} \right) + 8 \times A42 \right\} \times f1^3 + 2.29 \right] < 0.028.$$

10. The optical information recording/reproducing device according to claim 8, wherein when Abbe number of the second optical element at a d-ray is represented by vd2, the second optical element satisfies a condition:

$$40 \leq vd2 \leq 80 \quad (3).$$

11. The optical information recording/reproducing device according to claim 8,
wherein when a radius of curvature, a conical coefficient and an effective radius of a first surface of the first optical element are respectively represented by r1, k1 and h1, and an effective radius of the cementing surface is represented by h2, the objective lens satisfies one of following conditions (4) and (5):

$$|(nR2 - nR1) - (nB2 - nB1)| > 0.005 \quad (4)$$

$$0.50 < \frac{RK2}{RK1} < 1.30 \quad (5)$$

where $RK1 = \dfrac{(h1^2/r1)}{\left[1 + \sqrt{1 - (k1+1) \times (h1/r1)^2}\right]}$ $RK2 = \dfrac{(h2^2/r2)}{\left[1 + \sqrt{1 - 2(k1+1) \times (h2/r2)^2}\right]}$.

12. The objective lens according to claim 8, wherein:
at least one of two surfaces of the objective lens other than the cementing surface includes a phase shift structure having a plurality of refractive surface zones concentrically formed about an optical axis of the objective lens; and
the phase shift structure is configured to give an optical path length approximately equal to $2\lambda_1$ to the first light beam in adjacent ones of the plurality of refractive surface zones.

13. The objective lens according to claim 8, wherein:
at least one of two surfaces of the objective lens other than the cementing surface includes a phase shift structure having a plurality of refractive surface zones concentrically formed about an optical axis of the objective lens; and
the phase shift structure is configured to give an optical path length approximately equal to $10\lambda_1$ to the first light beam in adjacent ones of the plurality of refractive surface zones.

14. The optical information recording/reproducing device according to claim 8,
wherein the objective lens is configured to satisfy a condition:

$$0.01 < d1/d2 < 0.20 \quad (6)$$

where d1 represents a center thickness of the first optical element, and d2 represents a center thickness of the second optical element.

* * * * *